May 1, 1951 D. B. FERGUSON 2,551,320
CASTING REEL
Filed May 14, 1947 2 Sheets-Sheet 1
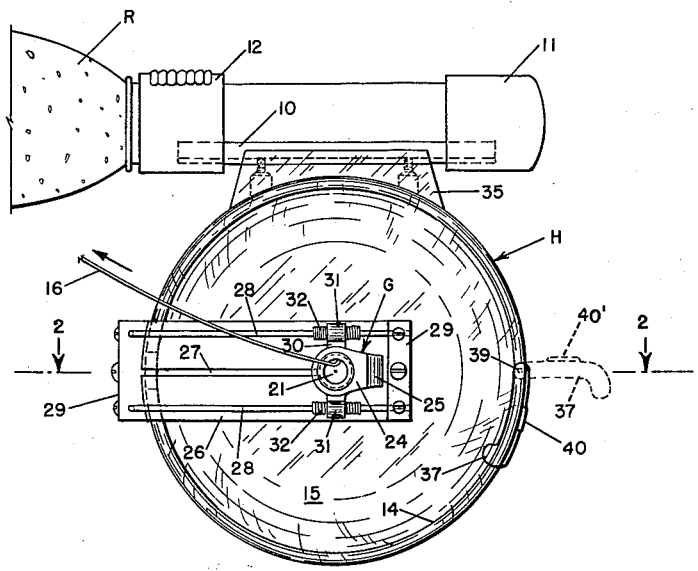
FIG. 1
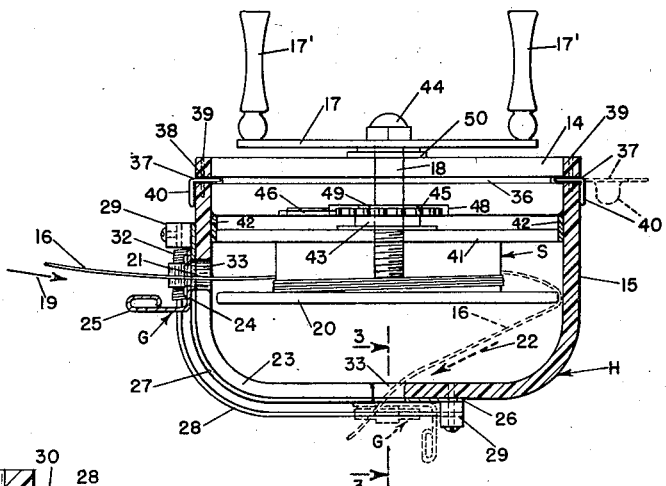
FIG. 2
FIG. 3
INVENTOR.
DANIEL B. FERGUSON
BY
Horace B. Van Valkenburgh
ATTORNEY May 1, 1951  D. B. FERGUSON  2,551,320
CASTING REEL
Filed May 14, 1947  2 Sheets-Sheet 2

INVENTOR.
DANIEL B. FERGUSON
BY
Horace B. Van Valkenburgh
ATTORNEY

Patented May 1, 1951

2,551,320

UNITED STATES PATENT OFFICE 2,551,320

CASTING REEL

Daniel B. Ferguson, Denver, Colo.

Application May 14, 1947, Serial No. 748,051

17 Claims. (Cl. 242—84.5)

This invention relates to casting reels used in fishing, and more particularly to casting reels of the so-called "spinning" type, in which the line during casting passes off the end of a spool.

A casting reel of the spinning type, which is quite well known, consists of a spool mounted with its axis parallel to the axis of the rod on which the spool is mounted. During casting, the line, which is wound on the spool, passes off the end of the spool toward the tip of the rod. When the line is to be wound in, a pickup arm or finger, which is placed in a non-interfering position during the casting, is swung back into winding position, and forces the line to travel around onto the spool as the arm rotates. Such a spool is, of course, stationary at all times and the rotating arm tends to foul the line and also may be in various positions when the fisherman wishes to start winding in. Thus, it is often necessary to search for the arm, which sometimes delays the start of the winding operation sufficiently, so that the fish may be lost. Also, the diameter of the spool is limited, so that it is necessary to provide a step-up in speed between the crank and the pickup arm. Furthermore, since the crank must be positioned to extend to the side of the rod, the reel is unduly complicated by such positioning of the crank.

Among the objects of this invention are to provide a novel casting reel of the spinning type; to provide such a reel in which the position of the incoming and outgoing line is definitely determined; to provide such a reel in which the spool, on which the line is wound, and the crank may be mounted complementary to each other and the axis of each perpendicular to the longitudinal axis of the rod; to provide such a reel in which the changeover from casting to winding or reeling position is always effected at the same places; to provide such a reel in which the operating parts may be made visible; to provide such a reel in which provision may be made for a ratchet, and/or a brake, without increasing the size of the reel; to provide such a reel in which a step-up or speed increase between the crank and the spool is normally unnecessary, but may be incorporated within a reel without undue complication; and to provide such a reel which is relatively simple in construction and has little tendency to get out of adjustment.

Other objects and the novel features of this invention will become apparent from the following description, taken in connection with the accompanying drawings, in which:

Fig. 1 is a side view of a reel constructed in accordance with this invention, mounted on a fishing rod;

Fig. 2 is a cross section taken along line 2—2 of Fig. 1;

Fig. 3 is an enlarged fragmentary section taken along line 3—3 of Fig. 2, illustrating more clearly a guide for the line;

Figure 4:
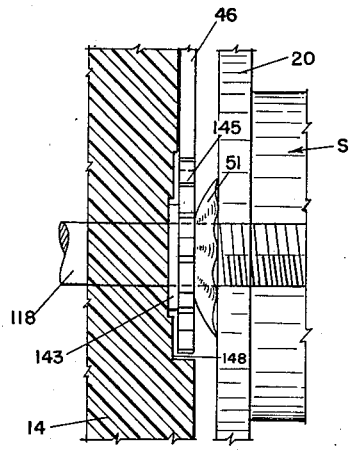
Fig. 4 is an enlarged fragmentary section of a reel similar to that of Fig. 1, but provided with a combination brake and ratchet.

As illustrated in Figs. 1 and 2, a casting reel constructed in accordance with this invention comprises in general a housing H, adapted to be attached to a fishing rod R in the usual manner, as a transversely curved attaching strip 10 received by a fixed ring 11 and a movable ring 12 on the rod. The housing H is divided into two parts—a base 14 and a cover 15, both preferably being made of transparent material, such as a plastic resin of the methyl methacralate, polystyrene, vinylidene chloride, vinyl acetate, or other type. If desired, the base 14 may be colored slightly, but preferably insufficiently to prevent the working parts from being visible from either side of the exterior of the housing H. Cover 15 may be flattened at the end, as shown.

The cover 15 carries a line guide G, which is movable from the full to the dotted position of Fig. 2, and vice versa, during use, the full position of Fig. 2 being that in which the line 16 is wound on a spool S, the spool S being operatively connected to a crank 17 by a pin or bolt 18, which forms a shaft for the spool. Thus, with guide G in the end or solid position of Fig. 2, i. e. generally radial with respect to the spools, as the crank 17 is turned in the necessary direction by its handles 17', the line 16 will be wound upon the spool S, moving in the direction of the arrow 19. When the guide G is moved to the dotted position of Fig. 2 (which corresponds to the solid position of Fig. 1), i. e. generally axial with respect to the spool S, the line 16 may be pulled from the spool, as during casting, passing outwardly around the outer flange 20 of spool S and through an eye 21 in guide G, as shown by the dotted position of line 16 in Fig. 2, the line moving in the direction of the arrow 22. Since the spool S does not rotate during casting, there is very little friction to interfere with movement of the line passing off the spool, and the tendency for friction to be produced or the line to become fouled is further reduced by the adequate space between the spool S and the cover 15, due to the shape of the cover. Thus, a relatively long cast can be made. As soon as the cast has been made, in order to begin winding up the line, the guide G need be shifted only from the dotted or axial to the full or radial position of Fig. 2, the cover 15 of housing H being provided with a slot 23 to accommodate movement of the line from casting to winding or reeling position, and vice versa.

Eye 21 of guide G, through which the line 16 is inserted and moves during both casting and winding, may be formed in the base of a tab 24, which is provided with an outwardly extending flange 25, to permit the fisherman or user to move the guide to casting and winding positions. As in Figs. 2 and 3, a curved wear plate 26, having a slot 27 corresponding to slot 23 in cover 15, is attached to the outside of the cover, and prevents undue wear on the material of the cover by movement of the guide. Guide G, during movement from casting to winding position and vice versa, moves along a pair of parallel wires 28, bent to shape to correspond to the exterior shape of cover 15 and extending between mounting blocks 29, in suitable holes in which the wires are inserted and to which they may be attached by set screws, as shown. The mounting blocks 29 are attached to the cover 15, along with wear plate 26, in a suitable manner, as by screws. To insure easy movement of guide G along wires 28, and also to cause the guide to be retained in any set position, the guide includes a plate 30 having a center hole to which tab 24 is attached at eye 21, and provided with a pair of arms 31 which extend upwardly and around the wires 28, as in Fig. 3. Each arm 31 carries a short length of coil spring 32 which is adapted to follow the bend in wires 28, and which also produce sufficient friction on the wires to cause the guide G to remain fixed in position. Preferably, slot 23 in cover 15 and slot 27 in wear plate 26 terminate in enlarged holes 33 at each end, to more readily accommodate the passage of line 16, as in the manner also shown in Fig. 8.

Cover 15 may be former integrally with, or otherwise attached to, a mounting block 35 which, in turn, is attached to strip 10, as by screws as shown. When the reel is attached to the rod, the base 14 and spool S are removable as a unit from the housing, a suitable detachable connection between the cover and base being provided, such as by cooperating means comprising a peripheral slot 36 extending around base 14, and a pair of oppositely disposed hooks 37 pivotally mounted on pins 38, in slots 39 in cover 15, and adapted to extend into slot 36 in base 14. Hooks 37 are also provided with tabs 40 for easier access by the user, as for movement from the full to the dotted positions of Figs. 1 and 2, in detaching base 14 from cover 15. When the base 14 and spool S are removed from the cover 15, complete access to the spool is obtained, as for originally winding the line 16 thereon or for any other desired purpose, it being a relatively easy matter to thread the end of the line through eye 21 of guide G. However, when the spool is reinserted into the cover, there may be some tendency for the line 16 to become caught between an inner flange 41 of the spool S, and the inside of cover 15. However, by providing a clearance strip 42, extending around the inside of cover 14 and adapted to register with inner flange of spool S, such possibility is largely avoided. Clearance strip 41 may be formed by separate piece attached to the inside of cover 15, or formed integrally with the latter.

Figure 5:
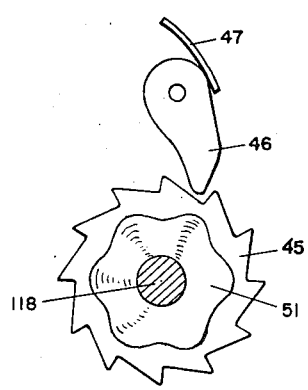
Fig. 5 is an end view of the brake and ratchet mechanism of Fig. 4.

Pin 18 extends through a suitable hole in base 14, which forms a bearing therefor, and may be threaded at both ends. One end of pin 18 is threaded into spool S up to a shoulder 43, and the other end accommodates a nut 44, by which crank 17 is held thereon, crank 17 always rotating with spool S. A ratchet wheel 45 may be fixedly mounted on pin 18 in abutment with shoulder 43, wheel 45 being adapted to cooperate with a ratchet lever 46, pressed against wheel 45 by a leaf spring 47, as shown more clearly in Fig. 5. Ratchet lever 46 is pivotally mounted on base 14, the base being provided with a cutout 48 to accommodate ratchet wheel 45 and ratchet lever 46. Bushings 49 and 50, respectively between crank 17 and base 14 and between ratchet wheel 45 and base 14, may also be provided. While housing H is preferably transparent plastic or the like, parts such as guide G, crank 17, pin 18, tab 24, wear plate 26, wires 28, blocks 29, springs 32, hooks 37, nut 44, ratchet wheel 45, and ratchet lever 46, are preferably made of a relatively strong metal resistant to corrosion, such as stainless steel. Bushings 49 and 50 may be made of bronze or copper, while leaf spring 47 may be made of high carbon or alloy spring steel.

In the construction shown in Fig. 2, the spool S can be turned in only one direction, i. e. to wind line 16 thereon, reverse movement being prevented by the ratchet. However, it may prove desirable to provide a friction connection between the ratchet wheel and spool S, so that if there is a pull on the line exceeding a predetermined amount, for instance, the spool S can unwind to prevent the line from being broken, as when a large fish is on the line. Also, it may happen that the fisherman would like to play out a little line, and in such case may prefer to pull the line to cause the spool to unwind, rather than shift the guide G back to the casting position, for unwinding the line from the end of the spool. For such purpose, and as shown in Fig. 4, a ratchet wheel 145 may be mounted for rotation about a pin 118, which is provided with a shoulder 143, which also acts as a bushing between the ratchet wheel and base 14. The ratchet lever 46 of Fig. 4 is identical with the ratchet lever of Fig. 2, a cutout 148 being provided in base 14 to accommodate shoulder 143 as well as the ratchet wheel and lever. To provide frictional transmission between spool S and ratchet wheel 145, a cup spring 51, shown also in Fig. 5, bears between inner flange 41 of the spool and the ratchet wheel. Cup spring 51 may be a type having a series of flanges, which are preferably placed against spool S, so that the cup spring will rotate with the spool and thereby reduce wear on the same. Adjustment of the pressure produced by spring 51 is obtained by screwing pin 118 inwardly or outwardly of spool S. Particularly when the material of the spool is a methyl methacrylate resin or similar material, the spool threads act as a lock on the metal threads of the pin. Thus, a force necessary to overcome the friction between spring 51 and ratchet wheel 145, and between ratchet wheel 145 and shoulder 143 will be sufficient to cause the spool S to unwind. Preferably, such force is proportioned so that undue effort will not be necessary, but accidental unwinding will be prevented. Of course, crank 17, being directly connected to spool S, will always rotate therewith, so that the spool S may also be turned in an unwinding direction by turning crank 17 in a reverse direction. Also, any sudden surge by a fish may be controlled by the fisherman through crank 17.

In the additional construction illustrated in Fig. 6, the spool S is mounted on the inner end of a countershaft or pin 55, cup spring 51, ratchet wheel 145, and ratchet lever 46 operating in the manner described in connection with Fig. 4. However, crank 17 is mounted off-center on an auxiliary pin 56 having attached to its inner end a gear 57, in engagement with a pinion 58 on countershaft 55, to step up or increase the rotation of spool S when crank 17 is turned. Because of the reduction in thickness of base 114, occasioned by a cutout 59 to accommodate the gearing, a bushing 60 may be provided as a bearing for countershaft 55, and a bushing 61 for auxiliary pin 56. Bushings 60 and 61 may be formed of bronze or other suitable material, and it will be understood, of course, that similar bushings may be provided for pin 18 of Fig. 2 or pin 118 of Fig. 4.

Figure 6:
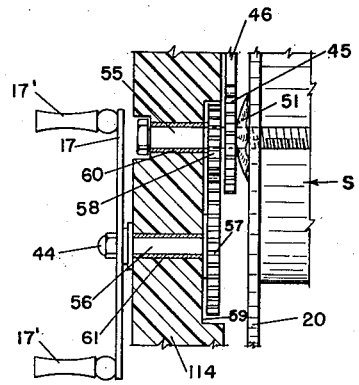
Fig. 6 is a fragmentary cross section illustrating a reel similar to that of Fig. 4, and also equipped with gearing for increasing the speed of the line spool.

The construction of Fig. 6, in which gearing is used to increase the winding speed, is ordinarily unnecessary for the construction of Figs. 1 to 3, since the spool S has a drum of sufficient diameter to permit the line to be wound in relatively quickly. Thus, a drum diameter of 1¾ inches is possible, with an exterior diameter of cover 15 of 3 inches, and a normal fast wind with the crank is sufficient. Furthermore, due to the guiding effect on the line of cover 15, little difficulty will be had in quick removal of line 16 from the spool during casting, and due to the accessability of guide G—particularly due to the fact that it is in an identical position each time the user wishes to shift the guide from the casting to the winding position, or vice versa, the changeover is readily made.

Figure 7:
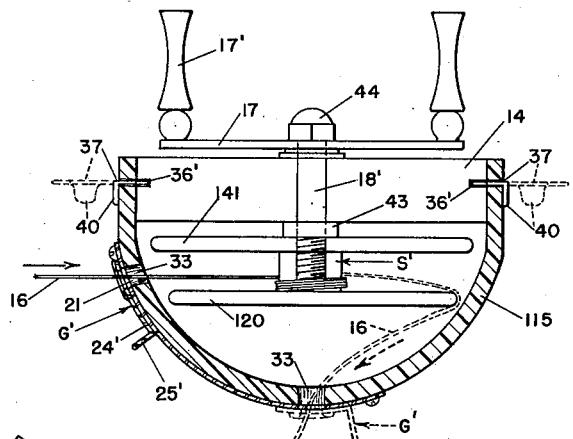
Fig. 7 is a transverse section, taken along line 7—7 of Fig. 8, of an alternative reel construction.
Figure 8:
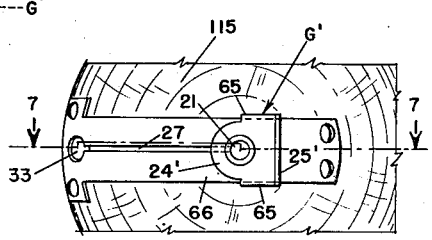
Fig. 8 is a fragmentary side view of the reel of Fig. 7, showing particularly a line guide and associated parts.

The construction illustrated in Figs. 7 and 8 is somewhat simpler than the preferred construction previously described, cover 115 thereof being substantially hemispherical in shape, and the outer flange 120 of spool S' being smaller than inner flange 141. The drum of spool S' is smaller than that of spool S, previously described, because of the limitations imposed upon outer flange 120, but guide G' moves along an arcuate path. Also, guide G' is simpler, consisting only of a tab 24', provided with an eye 21 and a flange 25', and also provided with bent over edges 65 adapted to engage the edges of a guide strip 66, which is merely screwed or otherwise secured to cover 115. Crank 17 is attached, in a manner similar to that described in connection with Fig. 1, to pin 18', on the opposite end of which is mounted spool S', in abutment against shoulder 43'. Also, cover 115 and base 114 are removably attached by hooks 37, as before, which are movable from the full to the dotted positions of Fig. 7. Hooks 37 are pivoted on cover 115 in the manner previously described, and are adapted to engage slots 36' in base 114. As before, cover 115 is provided with a slot 23, and guide strip 66 is provided with a slot 27, each of which is provided with an enlarged hole 33 at each end, as shown, the more readily to accommodate the line 16 during winding in and casting out.

From the foregoing, it will be evident that the casting reel of this invention fulfills to a marked degree the objects and requirements hereinbefore set forth. The guide G with eye 21 insures that the line 16 will be in position for casting or winding, as the case may be. The cover 15 cooperates with the spool S in guiding the line during casting, and also provides support for movement of the guide G from casting to winding position, and vice versa. A transparent housing provides many advantages, such as insuring that the user will have full view of the spool S and the position of line 16 thereon, and enabling the user to view the operating mechanism at any time, and to be able immediately to detect any slight misadjustment or the like, which can be corrected before any ill effects are suffered. The complete enclosure of the spool S by the housing insures that the line, when on the spool, will not become caught or damaged by brush, limbs, or the like. Also, the spool cannot be accidentally bumped or damaged. The quick and easy removability of the base 14 from the cover 15, the addition of various parts such as a ratchet wheel, a brake or clutch device, and the like, can be accomplished in a simple and effective manner. Also, when desired, additional gearing may be installed, although the same usually is unnecessary.

The positive path over which the guide G moves insures that the user need not search wildly for the position of an arm or finger when the cast is finished, and winding is to be started. Since the parts other than plastic are preferably made of stainless steel or the like, there is little problem of corrosion or similar damage to parts. While the construction shown in Figs. 1 to 3 is preferred, that of Figs. 7 and 8 has many of the above advantages and may be used when a smaller spool is adequate, and a simpler and cheaper construction is desired.

Additional alternative constructions may be made, such as one in which spool S is wider, with a relatively thick outer flange 20, to act better as a guide for the line, and in which base 14 is lesser in width, so that the winding position of guide G will be centered directly under the pole, to reduce the tendency for whipping of the line. In such construction, the base 14 may be provided with an inwardly projecting cylinder on which spool S rotates, and on the end of which ratchet wheel 45, ratchet lever 46, and springs 47 and 51 are mounted, these parts thus also being enclosed within a well formed in spool S which receives the above cylinder. Also, cover 15 and base 14 may be detachably connected by exterior clips fitting into slots on the outside of cover 15.

It will be evident that various changes may be made in the material of which the various parts are made, in the manner of construction, and other variations which will suggest themselves to those skilled in the art. Thus, equivalent parts may be used, as for the guide G and the means for causing it to follow a desired path, and also the means for securing it to the reel. It will also be understood that other and additional changes may be made without departing from the spirit and scope of this invention.

What is claimed is:

1. A casting reel comprising a housing having a detachably connected base and transparent cover; means on said cover for attaching said reel to a rod; a rotatable pin extending through said base in a direction generally perpendicular to the longitudinal axis of said rod; a line spool having inner and outer flanges and mounted on one end of said pin adjacent said base within said cover; a crank disposed exteriorly of said base and mounted on the opposite end of said pin; a guide having an eye through which said line may extend, and movable relative to said spool between a winding position generally radial with respect to said spool and a casting position generally axial with respect to said spool, said cover having a slot therein to accommodate said line upon such movement; and a support for said guide mounted on said cover.

2. A casting reel as defined in claim 1, wherein said slot in said cover is enlarged at the winding and casting positions of said guide.

3. A casting reel comprising a housing; a line spool having inner and outer flanges and mounted for rotation within said housing; a crank disposed exteriorly of said housing operatively connnected with said spool; a guide having an eye through which said line may extend, and movable relative to said spool between a winding position generally radial with respect to said spool and a casting position generally axial with respect to said spool; and a support for said guide mounted on said housing and along which said guide is adapted to slide between said positions.

4. A casting reel as defined in claim 3, wherein said support includes parallel wires spaced from said housing and engaged by said guide.

5. A casting reel as defined in claim 4, including means producing friction between said guide and said wires.

6. A casting reel as defined in claim 5, wherein said friction producing means comprises a coil spring surrounding each wire and mounted on said guide.

7. A casting reel comprising a housing having a detachably connected, transparent base and cover; means on said cover for attaching said reel to a rod; a rotatable pin extending through said base in a direction generally perpendicular to the longitudinal axis of said rod; a line spool having inner and outer flanges and mounted on one end of said pin adjacent said base within said cover; a crank disposed exteriorly of said base and operatively associated with and thereby adapted to rotate said pin; a guide having an eye through which said line may extend, and movable relative to said spool between a winding position generally radial with respect to said spool and a casting position generally axial with respect to said spool, said cover having a slot therein to accommodate said line upon such movement; a support for said guide mounted on said housing; a ratchet wheel mounted on said pin between said spool and said base; and a ratchet lever mounted on said base for engaging said ratchet wheel.

8. A casting reel as defined in claim 7, wherein said ratchet wheel is fixed to said pin.

9. A casting reel as defined in claim 7, wherein said ratchet wheel is rotatable on said pin, said reel including friction means connecting said ratchet wheel and said spool.

10. A casting reel as defined in claim 9, wherein said friction means includes a spring acting between said ratchet wheel and said spool.

11. A casting reel as defined in claim 10, wherein said spring comprises a cup spring having flanges bearing against said spool and said pin is provided with a shoulder against which said ratchet wheel bears, said pin threadedly engaging said spool and the pressure of said spring being adjustable thereby.

12. A casting reel comprising a housing having a detachably connected, transparent base and cover; means on said cover for attaching said reel to a rod; a pair of spaced rotatable pins, each extending through said base in a direction generally perpendicular to the longitudinal axis of said rod, the first said pin being provided at its inner end with a pinion and the second said pin with a gear in mesh therewith; a bushing for at least the first said pin; a line spool having inner and outer flanges and mounted on the inner end of the first said pin adjacent said base within said cover; a crank disposed exteriorly of said base and mounted on the outer end of the second said pin; a guide having an eye through which said line may extend, and movable relative to said spool between a winding position generally radial with respect to said spool and a casting position generally axial with respect to said spool, said cover having a slot therein to accommodate said line upon such movement; a support for said guide mounted on said housing; a ratchet wheel mounted on the first said pin between said spool and said base; and a ratchet lever mounted on said base for engaging said ratchet wheel.

13. A casting reel comprising a housing having a detachably connected, transparent base and cover, said base being cylindrical and said cover having cylindrical sides and a flattened end opposite said base; means on said cover for attaching said reel to a rod; a rotatable pin extending through said base in a direction generally perpendicular to the longitudinal axis of said rod; a line spool having inner and outer flanges of substantially equal diameter and mounted on one end of said pin adjacent said base within said cover; a crank disposed exteriorly of said base and operatively connected with the opposite end of said pin; a guide having an eye through which said line may extend, and movable relative to said spool between a winding position generally radial with respect to said spool and a casting position generally axial with respect to said spool, said cover having a slot therein having an enlarged hole coinciding with each of the forward and end positions of said guide, to accommodate said line upon such movement; a support for said guide mounted on said housing and including a pair of parallel wires spaced from and conforming to the contour of said housing and engaged by said guide; ratchet means generally permitting rotation of said pin and said spool in one direction only; and friction means permitting rotation of said spool in the opposite direction upon the application of a predetermined force.

14. A casting reel comprising a housing having a detachably connected, transparent base and cover, said base being cylindrical and said cover being hemispherical; means on said cover for attaching said reel to a rod; a rotatable pin extending through said base in a direction generally perpendicular to the longitudinal axis of said rod; a line spool having an inner flange and an outer flange of lesser diameter and mounted on one end of said pin adjacent said base within said cover; a crank disposed exteriorly of said base and mounted on the opposite end of said pin; a guide having an eye through which said line may extend, and movable relative to said spool between a winding position generally radial with respect to said spool and a casting position generally axial with respect to said spool, said cover having a slot therein to accommodate said line upon such movement; and a support for said guide including a strip conforming in shape to and mounted on said housing, the edges of said strip being engaged by said guide.

15. A casting reel comprising a housing; a spool mounted for rotation within said housing, said housing having an aperture through which a line may extend to be wound on and pass off said spool; means movable to different positions for causing said line to be wound on said spool upon rotation thereof, and to pass off said spool in the direction of the axis of said spool and through said housing aperture; a crank disposed exteriorly of said housing; a shaft for said spool; gearing connected between said crank and said spool shaft, for rotating said spool; a ratchet wheel rotatable on said shaft; a latch restricting rotation of said ratchet wheel to one direction; and friction means including a spring acting between said ratchet wheel and spool to cause said ratchet wheel to rotate with said spool in one direction with said latch and to cause said ratchet wheel normally to prevent rotation of said spool, reversely in a direction against said latch, but to permit said spool to rotate reversely upon the imposition of a predetermined force.

16. A casting reel comprising a housing; a spool within said housing, said housing having an aperture through which a line may extend to be wound on and pass off said spool, and one of said housing and spool being rotatable with respect to the other; means movable to different positions on said housing for causing said line to be wound on said spool upon such relative rotation, and permitting said line to pass off said spool in the direction of the axis of said spool; a shaft for said spool; a ratchet wheel rotatable on said shaft; a latch restricting rotation of said ratchet wheel to one direction; and friction means including a spring acting between said ratchet wheel and spool to permit said spool to rotate reversely to the permitted direction of rotation of said ratchet, upon the imposition of a predetermined force on said line, tending to withdraw said line radially from said spool.

17. A casting reel comprising a housing; a line spool having inner and outer flanges and mounted for rotation within said housing; a crank disposed exteriorly of said housing and operatively connected with said spool; a guide having an outwardly extending flange for manual adjustment and an eye through which said line may extend, said guide being movable relative to said spool between a winding position generally radial with respect to said spool and a casting position generally axial with respect to said spool and said housing having a slot therein to accommodate said line upon such movement; and a support for said guide mounted on said housing, said support including a pair of parallel wires spaced from said housing and engaged by said guide, and a wear plate mounted on said housing and having a slot for said line registering with said housing slot.

DANIEL B. FERGUSON.

REFERENCES CITED

The following references are of record in the file of this patent:

UNITED STATES PATENTS

| Number | Name | Date |
| --- | --- | --- |
| 161,314 | Winans et al. | Mar. 23, 1875 |
| 2,034,917 | Miller | Mar. 24, 1936 |
| 2,179,413 | Kolosso | Nov. 7, 1939 |

FOREIGN PATENTS

| Number | Country | Date |
| --- | --- | --- |
| 8,517 of 1910 | Great Britain | Jan. 26, 1911 |